Aug. 12, 1947.  C. E. ENNIS  2,425,309
RELEASABLE GLIDER TOW CABLE COUPLING LOCK
Filed July 10, 1944
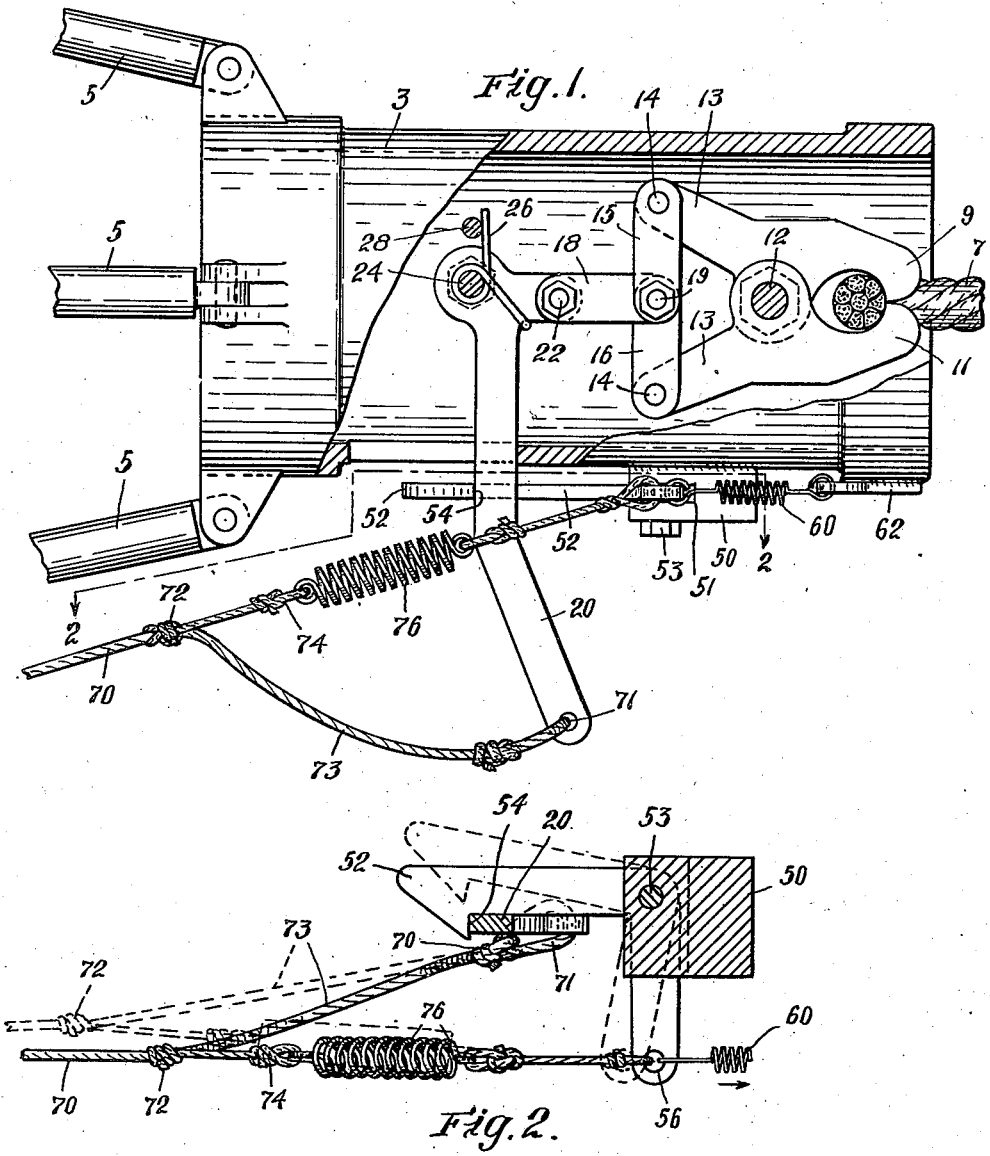
Inventor.
CLYDE E. ENNIS Patented Aug. 12, 1947

2,425,309

UNITED STATES PATENT OFFICE 2,425,309

RELEASABLE GLIDER TOW CABLE COUPLING LOCK

Clyde E. Ennis, Danville, Va.

Application July 10, 1944, Serial No. 544,315

7 Claims. (Cl. 280—33.15)

(Granted under the act of March 3, 1883, as amended April 30, 1928; 370 O. G. 757)

It is stipulated that the invention described herein may be manufactured and used by or for the Government for governmental purposes without the payment of any royalty thereon, as provided in the act of March 3, 1883, as amended (45 U. S. C. A. section 45).

This invention relates to releasable tow cable couplings used on airplanes adapted to tow gliders, and provides in combination with a standard form of releasable coupling a safety lock which insures against any inadvertent release of a tow cable from the coupling during flight.

In view of the character of gliders, it is highly important that the gliders are not prematurely or inadvertently released from the towing ship and experience has shown that standard forms of couplings cannot be relied upon to retain the tow cables under all circumstances. Many instances of premature release of the glider have occurred over terrain unsuitable for landing or short of objectives, with resulting obvious annoyance and oftentimes calamity.

It is an object of this invention to provide a simple, practical, positive safety lock which can be used with a standard form of releasable coupling and which, in its preferred form, is so arranged that the safety lock is automatically unlocked at the desired time for release without requiring any separate or additional operation on the part of the releasing pilot.

The construction of such a safety lock is shown in the accompanying drawings, wherein:

Fig. 1 is a side elevation, partly broken away to show cross-sectional details, of a standard form of releasable tow cable coupling assembly supplemented with the safety lock of my invention; and Fig. 2 is a cross-sectional detail taken substantially along the line 2—2 of Fig. 1 and showing the structure of the safety lock of the invention, indicating one position of the parts in full lines and another position in dotted lines.

As shown in Fig. 1, a standard form of releasable glider tow cable coupling comprises a tubular housing 3 carrying pivoted struts 5 forming a triangular support for attachment of the housing 3 to the tail structure of a towing plane, the struts 5 being shown broken off. The rear end of the tubular housing 3 is open to receive the bight of a tow cable, one leg of which is indicated at 7. The bight 7 is held between two cooperating jaws 9 and 11 commonly pivoted about a shaft 12 and having protruding legs 13 which are pivotally connected at points 14, 14 to links 15 and 16 pivoted at their other ends to a link 18 on a shaft 19 to form a toggle. Link 18 is in turn connected with a bell crank lever 20 at a pivot 22, the bell crank lever 20 being mounted for oscillation on a shaft 24 fixedly mounted across the housing 3. As will be understood, the shaft 12 is also fixedly mounted across the housing 3 while the shafts forming pivots 14, 14, 19 and 22 float relative to the housing 3. The toggle links may be double links to secure rigidity. The lever 20 extends through a slot in the bottom portion of the housing 3 and acts as a releasing or tripping lever to make and break the toggle to pivot the jaws 9 and 11 about the shaft 12, to open and close the coupling. In Fig. 1, the toggle is shown in a position to retain the jaws in abutted closed relation.

Heretofore it has been usual to attempt to maintain the jaws 9 and 11 of the coupling in closed position as shown by mounting springs 26 on the shaft 24 on both sides of the bell crank lever 20, one end of the springs abutting a stop in the form of a shaft 28 extending across the housing and the other end of the springs 26 being caught under one arm of the bell crank lever 20 so that the springs 26 will act to yieldably urge the bell crank lever in a counter-clockwise direction as shown in Fig. 1, to maintain the coupling jaws 9 and 11 in abutted relation.

Since, however, springs such as just described can at best provide only a yieldable tension, such construction was often inadequate to prevent the strain imposed upon a coupling by the tow cable from separating the jaws and thus inadvertently releasing the cable.

It was also usual to provide an operating cable running from the releasing lever 20 to the cockpit of the towing plane so that a forward motion or jerk of the cable would move the bell crank lever 20 in a clockwise direction about the shaft 24 against the tension of spring 26 to drop the pivot 22, move the pivot 19 to the left, thus breaking the toggle, and opening the jaws 9 and 11.

In accordance with this invention, I supplement the construction as just described with a positive safety lock or catch, which, as shown in the drawings, is preferably designed to perform its locking action with respect to the trip lever 20.

The safety lock comprises an auxiliary housing 50 which may be conveniently welded along the external surface of the housing 3 and having at one end thereof a slot-like recess 51 adapted to receive a bell crank lever 52 which is held within the recess by a bolt 53 extending across the recess. The bell crank lever 52 is so mounted that it may oscillate about the bolt 53 as a pivot.

As shown in Fig. 2, one arm of the bell crank lever 52 carries a safety catch 54 and the other arm thereof is provided with an aperture 56 through which is inserted one end of a coil spring 60 the other end of which is fixedly secured to a clip 62 welded to the rear end of the housing 3. The coil spring 60 thus acts to urge the lever 52 into the full line position shown in Fig. 2 with its catch surface 54 extending into the path of movement of the releasing lever 20, thereby positively locking the releasing lever in coupling position and preventing movement of the releasing lever 20 or of the jaws 9 and 11 of the coupling. Accordingly, the tow cable cannot be released while the safety catch lever 52 is in the full line position shown in Fig. 2.

In order to provide convenient and positive means for releasing the tow cable, I utilize a releasing cable 70 attached at one end of the releasing lever 20 through a suitable aperture 71 and having its other end, shown broken off in the drawings, extending to the cockpit of the towing plane. This main cable 70 is similar to that used with the previously known standard coupling. In order, however, to render a pull on the cable 70 effective to release the tow cable, I incorporate suitable means for removing the safety lock from locking position. A simple and effective manner of arranging a safety lock release without complicating the releasing operation is shown in the drawings. At a point 72, intermediate the ends of the cable 70, I fasten one end of an auxiliary cable 74, the other end of which is fastened to the safety lock lever 52, as through the aperture 56.

The auxiliary cable 74 has a resilient connection interposed therein. In the form shown in the drawings, this connection takes the form of a coil spring 76. For reasons which will presently appear, the spring 76 is of greater strength than the spring 60. The auxiliary cable 74 is of such length that, when the coil spring 76 is relaxed, and the parts are in the assembled relation shown with the forward end of the main cable 70 running in a direction towards its point of operation and tensioning the auxiliary cable 74, there will be slack in the portion 73 of the main cable 70 between the juncture point 72 and its point of fastening 71 to the releasing lever 20. The amount of slack 73 is such that the operator may pull the cable 70 in a forwardly direction relative to the tow plane a distance sufficient to move the auxiliary cable 74 and attached arm of the bell crank lever 52 to the dotted line position of the bell crank lever 52 shown in Fig. 2, against the tension of spring 60 and without substantially elongating the spring 76—which, as hereinbefore described, is less yielding than the spring 60—before the slack in portion 73 of the cable 70 is taken up. Thus initial movement of the cable 70 forwardly will release the safety lock. Continued forward motion of the cable 70 independent of the locking lever 52 is permitted by reason of the interposition of the resilient means 76 which elongates under the continued movement to such an extent that the slack 73 in the cable 70 is taken up and the main cable 70 can move the lever 20 in a clockwise direction as shown in Fig. 1 to trip the toggle and open the jaws of the tow coupling. Upon release of tension upon the main cable 70 by the releasing pilot, the springs 26 and 60 act to return both the lever 20 and the safety lock lever 52 to their original positions, the bell crank lever 52 being suitably bevelled at its catch end 53 to aid in this return movement, the spring 26 having greater strength than the spring 60 so that if the lever 52 extends into the path of movement of the lever 20 before the lever 20 has reached its coupling position, the safety catch 52 will yieldably move out of the path of the lever 20 until the lever 20 has moved beyond the path of movement of the surface 54 of lock lever 52.

As will be understood, each of the levers 20 and 52 may be provided with suitable stops to limit their extent of movement as desired for proper operation of the respective mechanisms.

As will be understood from the above description, the safety lock 52 provides a positive rigid lock against release of the tow cable 7 and the means provided for operation of the safety lock is such that despite the more effective locking, the operation from the standpoint of the releasing operator is no different than in the case of the standard releasable coupling which relies solely on a resilient tensioning of the coupling jaws and has no provision for a rigid, non-resilient, positive lock.

I claim:

1. In combination with a releasable glider tow cable coupling having a lever actuated releasing mechanism and a release cable attached to said lever, a safety lock comprising a movable catch member mounted adjacent said coupling for movement from a position extending into the path of movement of said releasing lever, locking said releasing lever in tow cable retaining position, to a position out of the path of movement of said releasing lever to permit movement of said releasing lever to tow cable releasing position and means for automatically moving said catch member to unlocked position in advance of releasing movement of said releasing lever by said release cable.

2. In combination with a releasable glider tow cable coupling having a lever actuated releasing mechanism and a main release cable attached to said lever, a safety lock comprising a movable catch member mounted adjacent said coupling for movement from a position extending into the path of movement of said releasing lever, locking said releasing lever in tow cable retaining position, to a position out of the path of movement of said releasing lever to permit movement of said releasing lever to tow cable releasing position, and an auxiliary cable attached to said catch member for moving said catch member from locked to unlocked position.

3. In combination with a releasable glider tow cable coupling having a lever actuated releasing mechanism and a main release cable attached to said lever, a safety lock as claimed in claim 2, wherein the auxiliary cable extends between the catch member and a point of attachment to the main cable intermediate the main cable ends, there being slack in the main cable between the juncture therewith of the auxiliary cable and the point of the attachment of the main cable to the releasing lever when tension is remotely applied to the auxiliary cable by tensioning the main cable from its point of operation, whereby unlocking of said safety lock by movement of said main cable precedes releasing movement of said releasing lever thereby.

4. In combination with a releasable glider tow cable coupling having a lever actuated releasing mechanism and a main release cable attached to said lever, a safety lock as claimed in claim 2 wherein the auxiliary cable extends between the catch member and a point of attachment to the main cable intermediate the main cable ends, there being slack in the main cable between the juncture therewith of the auxiliary cable and the point of attachment of the main cable to the releasing lever when tension is remotely applied to the auxiliary cable by tensioning the main cable from its point of operation, whereby initial movement of said main cable from its point of operation will unlock said safety lock in advance of tensioning of said slack portion of said main cable, a portion of the auxiliary cable comprising resilient means permitting yieldable movement of said auxiliary cable independently of said catch member after said catch member has reached unlocked position, whereby continued movement of said main cable will move said release lever to tow cable releasing position.

5. In combination with a releasable glider tow cable coupling having a housing and a lever actuated releasing mechanism, a safety lock comprising a bell crank lever mounted on said housing for pivotal movement, one arm of said bell crank lever terminating in a catch portion pivotally movable from a position extending into the path of movement of said releasing lever, locking said releasing lever in tow cable retaining position, to a position out of the path of movement of said releasing lever to permit movement of said releasing lever to tow cable releasing position, and a safety lock releasing cable attached to the other arm of said bell crank lever for moving said catch portion from locked to unlocked position.

6. In combination with a releasable glider tow cable coupling having a lever actuated releasing mechanism, a safety lock comprising a movable catch member mounted adjacent said coupling for pivotal movement from a locking position preventing movement of said releasing lever to tow cable releasing position, to an unlocking position permitting movement of said releasing lever to tow cable releasing position, and means for moving said catch member to unlocking position in advance of releasing movement of said releasing lever.

7. In combination with a releasable glider tow cable coupling having a lever actuated releasing mechanism, as claimed in claim 6, said safety lock having spring means for yieldably retaining said catch member in locking position.

CLYDE E. ENNIS.

REFERENCES CITED

The following references are of record in the file of this patent:

UNITED STATES PATENTS

| Number | Name | Date |
|---|---|---|
| 2,350,999 | Beirise | June 13, 1944 |
| 2,375,072 | Brown | May 1, 1945 |